(12) United States Patent
Barthelet et al.

(10) Patent No.: US 7,779,634 B2
(45) Date of Patent: Aug. 24, 2010

(54) USE OF COMPRESSOR TO TURBINE BYPASS FOR ELECTRIC BOOSTING SYSTEM

(75) Inventors: Pierre Barthelet, Remiremont (FR); Martin Verschoor, Rolling Hills Estate, CA (US)

(73) Assignee: Honeywell International Inc., Morristown, NJ (US)

( * ) Notice: Subject to any disclaimer, the term of this patent is extended or adjusted under 35 U.S.C. 154(b) by 386 days.

(21) Appl. No.: 11/658,284

(22) PCT Filed: Jul. 23, 2004

(86) PCT No.: PCT/US2004/023927
§ 371 (c)(1), (2), (4) Date: Jan. 23, 2007

(87) PCT Pub. No.: WO2006/022635
PCT Pub. Date: Mar. 2, 2006

(65) Prior Publication Data
US 2008/0282699 A1 Nov. 20, 2008

(51) Int. Cl.
F02D 23/00 (2006.01)
(52) U.S. Cl. .................. 60/607; 60/600; 60/605.2; 60/605.1
(58) Field of Classification Search .......... 60/600, 60/607; 123/559.1–559.2
See application file for complete search history.

(56) References Cited

U.S. PATENT DOCUMENTS

| | | | |
|---|---|---|---|
| 3,676,999 A | | 7/1972 | Oldfield |
| 3,988,894 A | * | 11/1976 | Melchior ............... 60/606 |
| 4,125,999 A | | 11/1978 | Melchior |
| 4,222,240 A | | 9/1980 | Castellano |
| 4,679,992 A | | 7/1987 | Watanabe et al. |
| 5,277,029 A | * | 1/1994 | Kidokoro et al. ........... 60/612 |
| 5,724,813 A | * | 3/1998 | Fenelon et al. ............ 60/606 |
| 5,771,868 A | * | 6/1998 | Khair .................. 123/568.12 |
| 6,062,026 A | * | 5/2000 | Woollenweber et al. .... 60/605.2 |
| 6,301,889 B1 | | 10/2001 | Gladden et al. |
| 6,351,946 B1 | | 3/2002 | Faletti |

(Continued)

FOREIGN PATENT DOCUMENTS

CH           262376          4/1947

(Continued)

OTHER PUBLICATIONS

PCT ISR/WO Honeywell.

*Primary Examiner*—Thomas Denion
*Assistant Examiner*—Douglas J. Duff
(74) *Attorney, Agent, or Firm*—Brian Pangrle

(57) ABSTRACT

An exemplary flow path for an electrically assisted turbocharger (220) includes a first opening to an air intake path (114) of an engine (110), the first opening positioned downstream from a compressor (224) of the turbocharger (220); a second opening to an exhaust path (116) of an engine (110), the second opening positioned upstream from the turbine (226) of the turbocharger (220); and a valve (229) controllable by a controller (240, 150, 160) wherein the controller (240, 150, 160) includes control logic for controlling the valve (229) and for controlling an electric motor (228) of the electrically assisted turbocharger (220). Various other exemplary devices, methods, systems, etc., are also disclosed.

15 Claims, 8 Drawing Sheets

U.S. PATENT DOCUMENTS

| | | | |
|---|---|---|---|
| 6,457,461 B1 * | 10/2002 | Romzek | 123/568.16 |
| 6,564,784 B1 * | 5/2003 | Onodera et al. | 123/568.12 |
| 6,568,173 B1 * | 5/2003 | Kolmanovsky et al. | 60/280 |
| 6,601,387 B2 * | 8/2003 | Zurawski et al. | 60/605.2 |
| 6,648,594 B1 | 11/2003 | Horner et al. | |
| 6,871,498 B1 * | 3/2005 | Allen et al. | 60/608 |
| 6,880,337 B2 * | 4/2005 | Masuda | 60/608 |
| 6,945,236 B2 * | 9/2005 | Nakai et al. | 123/568.12 |
| 7,032,382 B2 * | 4/2006 | Onodera et al. | 60/606 |
| 7,043,916 B2 * | 5/2006 | Masuda | 60/608 |
| 7,047,742 B2 * | 5/2006 | Kono et al. | 60/605.2 |
| 7,089,738 B1 * | 8/2006 | Boewe et al. | 60/605.2 |
| 7,296,561 B2 * | 11/2007 | Shirakawa et al. | 123/493 |
| 7,322,194 B2 * | 1/2008 | Sun et al. | 60/605.2 |
| 2003/0183212 A1 | 10/2003 | Gottemoller et al. | |
| 2005/0160733 A1 | 7/2005 | Onodera et al. | |

FOREIGN PATENT DOCUMENTS

| | | |
|---|---|---|
| DE | 10139526 | 2/2003 |
| EP | 1191208 | 3/2002 |
| EP | 1348849 | 1/2003 |
| FR | 2654013 | 6/1989 |
| FR | 2855562 | 2/2003 |
| GB | 2292587 | 2/1996 |
| WO | 9854449 | 12/1998 |

* cited by examiner

USE OF COMPRESSOR TO TURBINE BYPASS FOR ELECTRIC BOOSTING SYSTEM

TECHNICAL FIELD

Subject matter disclosed herein relates generally to turbochargers for internal combustion engines and, in particular, turbochargers with electric boosting capabilities.

BACKGROUND

Sophisticated air intake and exhaust controls for turbochargers have arisen in response to increased demands for reductions in fuel consumption and emissions of internal combustion engines. Such demands continue to increase through a broad range of requirements that seek higher power density, improved driveability, improved engine efficiency and improved emissions through technologies that include, for example, aftertreatment and exhaust gas recirculation. Demands proposed for future engines may prove quite difficult to meet. Indeed, some of these demands place seemingly contradictory requirements on turbocharger design and function.

An integrated solution that addresses both increased power density and good low end torque behavior (e.g., steady state and transient) is the so-called electrically assisted turbocharger. A commercially available electrically assisted turbocharger, marketed as the E-TURBO™ turbocharger (GARRETT® Engine Boosting Systems, Inc., Torrance, Calif.), can rely on exhaust gas flow energy and/or rely on an electric motor to drive the turbocharger shaft. In addition, the E-TURBO™ turbocharger can even operate as a generator. For example, at low engine speeds, an electronically controlled electric motor may respond to an engine load parameter or signal and drive the turbocharger's shaft to higher speeds. However, at high engine speeds where sufficient exhaust flow exists to drive the turbine, the electric motor can extract energy from the exhaust and thereby act as a supplementary generator for the vehicle's electrical system.

While such technology has helped to overcome demand hurdles, performance can be limited by compressor map width and, in particular, by compressor surge. Such a surge limitation can have the effect of requiring low end torque derating, hence diminishing some of benefits inured through use of an electric assist motor.

A compressor flow map, e.g., a plot of pressure ratio versus mass air flow, can help characterize performance of a compressor. In a flow map, pressure ratio is typically defined as the air pressure at the compressor outlet divided by the air pressure at the compressor inlet. Mass air flow may be converted to a volumetric air flow through knowledge of air density or air pressure and air temperature. Compression causes friction between air molecules and hence frictional heating. Thus, air at a compressor outlet generally has a considerably higher temperature than air at a compressor inlet. Intercoolers act to remove heat from compressed air before the compressed air reaches one or more combustion chambers.

A typical compressor flow map usually indicates compressor efficiency. Compressor efficiency depends on various factors, including pressure, pressure ratio, temperature, temperature increase, compressor wheel rotational speed, etc. In general, a compressor should be operated at a high efficiency or at least within certain efficiency bounds. As already mentioned, one operational bound is commonly referred to as a surge limit while another operational bound is commonly referred to as a choke area. Compressor efficiency drops significantly as conditions approach the surge limit or the choke area.

Choke area results from limitations associated with compressor wheel rotational speed and the speed of sound in air. In general, compressor efficiency falls rapidly as compressor wheel blade tips exceed the speed of sound in air. Thus, a choke area limit typically approximates a maximum mass air flow regardless of compressor efficiency or compressor pressure ratio.

A surge limit exists for most compressor wheel rotational speeds and defines an area on a compressor flow map wherein a low mass air flow and a high pressure ratio cannot be achieved. In other words, a surge limit represents a minimum mass air flow that can be maintained at a given compressor wheel rotational speed and a given pressure difference between the compressor inlet and outlet. In addition, compressor operation is typically unstable in this area. Surge may occur upon a build-up of back pressure at the compressor outlet, which can act to reduce mass air flow through the compressor. At worst, relief of back pressure through the compressor (e.g., a reverse flow through the compressor) can cause a negative mass air flow, which has a high probability of stalling the compressor wheel. Some compressor systems use a relief valve to help relieve such back pressure and thereby avoid any significant reduction of mass air flow through the compressor. Surge prevention can also reduce wear on a compressor and related parts.

Overall, surge of centrifugal compressors limits the useful operating range. Previous attempts to reduce surge limits for compressors have met with difficulties at low compressor wheel rotational speeds. For example, various previous attempts used a port between the compressor outlet and the compressor inlet to re-circulate some of the air mass when a build-up of back pressure occurred. However, such a port significantly reduced compressor efficiency.

Various exemplary methods, devices, systems, etc., presented herein aim to avoid surge limitations and thereby more fully realize the potential of an electric assist for a turbocharger. Other goals and achievements are also discussed herein.

BRIEF DESCRIPTION OF THE DRAWINGS

A more complete understanding of the various method, systems and/or arrangements described herein, and equivalents thereof, may be had by reference to the following detailed description when taken in conjunction with the accompanying drawings wherein.

DETAILED DESCRIPTION

Various exemplary methods, devices, systems, etc., disclosed herein address issues related to technology associated with turbochargers and are suitable for use with electrically assisted turbochargers and compressors.

Figure 1:
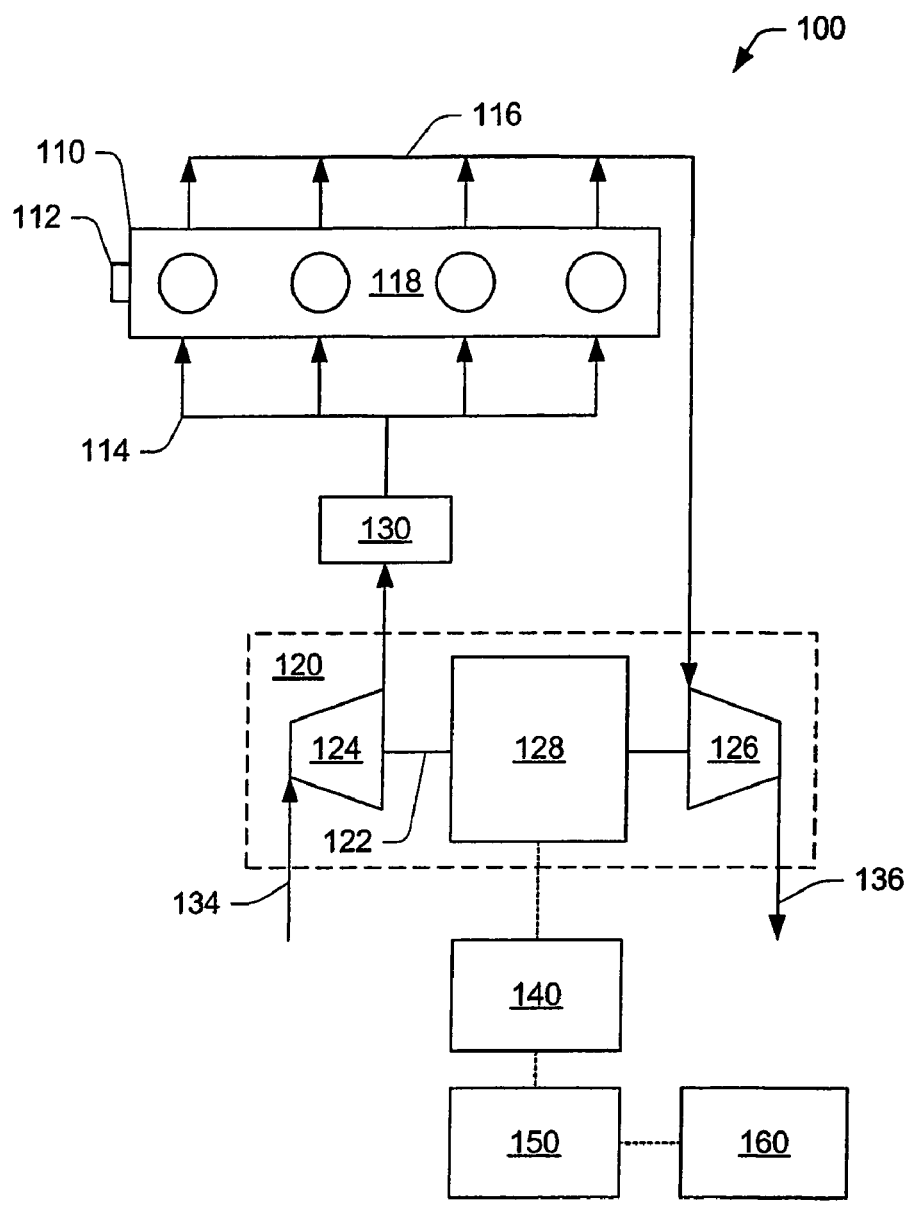
FIG. 1 is a simplified approximate diagram illustrating a prior art turbocharger system with an electric assist motor.

Turbochargers are frequently utilized to increase the output of an internal combustion engine. Referring to FIG. 1, a prior art system 100, including an internal combustion engine 110 and a turbocharger 120 with electric assist components (e.g., 128, 140, 150), is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120, includes an air inlet 134, a shaft 122, a compressor 124, a turbine 126, and an exhaust outlet 136.

The turbocharger 120 includes an electric motor and/or generator 128, referred to herein as an electric motor that may optionally include generator capabilities. The electric motor 128 receives commands from a control unit 140 which is optionally part of an engine control unit 150 that operates with other aspects of, for example, a vehicle control or electrical system 160.

The output of the compressor 124 flows to a heat exchanger (e.g., cooler) 130 that is typically used to extract heat from the compressed intake air prior to the intake port 114 of the engine 110. As mentioned in the Background section, compression causes friction between air molecules and hence frictional heating. Thus, air at a compressor outlet generally has a considerably higher temperature than air at a compressor inlet. In FIG. 1, the heat exchanger 130 is typically an intercooler that acts to remove heat from compressed air before the compressed air reaches one or more combustion chambers of the engine 110.

Referring to the turbine 126, such a turbine optionally includes a variable geometry unit and a variable geometry controller. The variable geometry unit and variable geometry controller optionally include features such as those associated with commercially available variable geometry turbochargers (VGTs), such as, but not limited to, the GARRETT® VNT™ and AVNT™ turbochargers, which use multiple adjustable vanes to control the flow of exhaust across a turbine.

Adjustable vanes positioned at an inlet to a turbine typically operate to control flow of exhaust to the turbine. For example, GARRETT® VNT™ turbochargers adjust the exhaust flow at the inlet of a turbine rotor in order to optimize turbine power with the required load. Movement of vanes towards a closed position typically directs exhaust flow more tangentially to the turbine rotor, which, in turn, imparts more energy to the turbine and, consequently, increases compressor boost. Conversely, movement of vanes towards an open position typically directs exhaust flow in more radially to the turbine rotor, which, in turn, increase the mass flow of the turbine and, consequently, decreases the engine back pressure (exhaust pipe pressure). Thus, at low engine speed and small exhaust gas flow, a VGT turbocharger may increase turbine power and boost pressure; whereas, at full engine speed/load and high gas flow, a VGT turbocharger may help avoid turbocharger overspeed and help maintain a suitable or a required boost pressure.

A variety of control schemes exist for controlling geometry, for example, an actuator tied to compressor pressure may control geometry and/or an engine management system may control geometry using a vacuum actuator. Overall, a VGT may allow for boost pressure regulation which may effectively optimize power output, fuel efficiency, emissions, response, wear, etc. Of course, an exemplary turbocharger may employ wastegate technology as an alternative or in addition to aforementioned variable geometry technologies.

Figure 2:
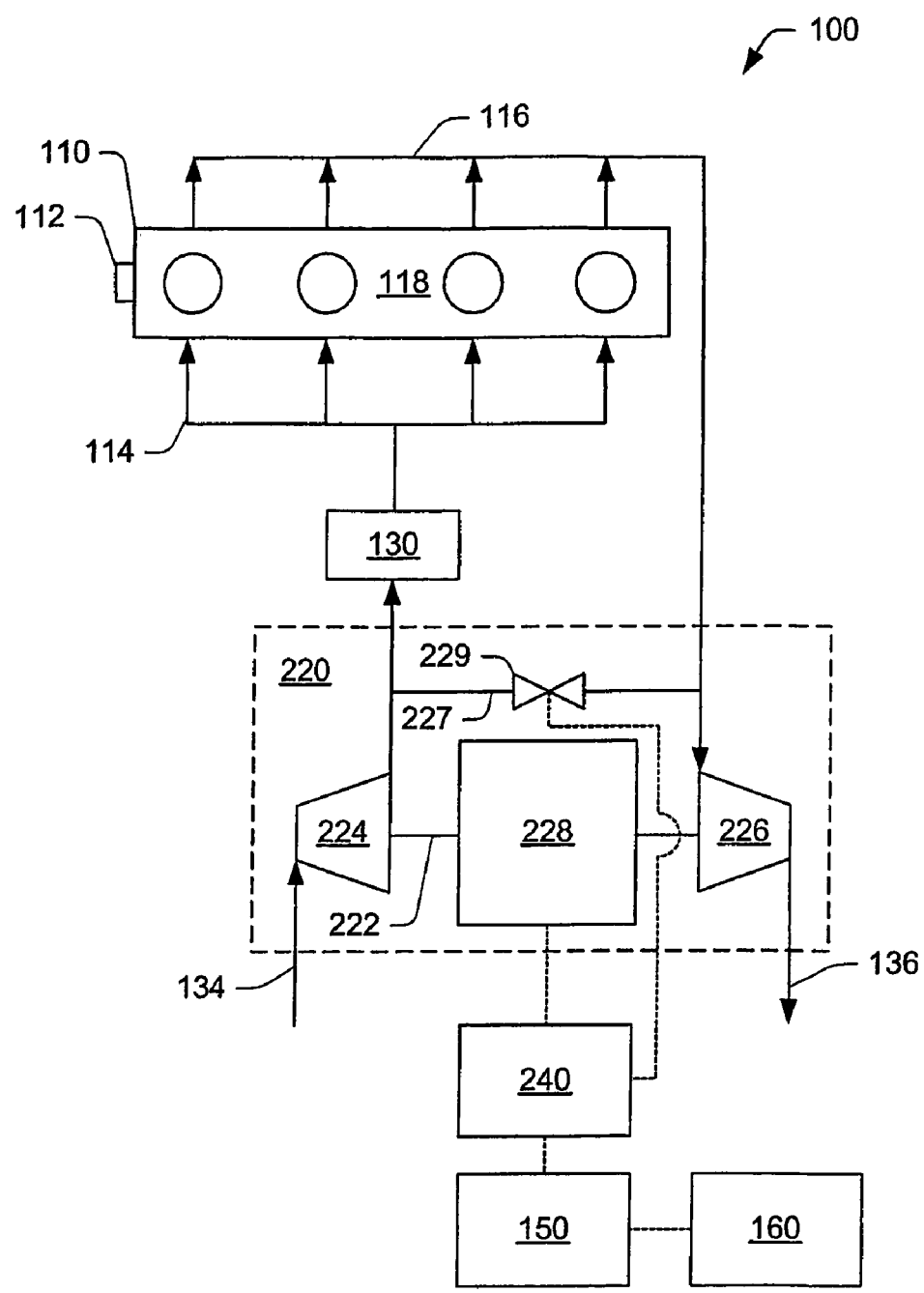
FIG. 2 is a simplified approximate diagram illustrating an exemplary turbocharger system with an exemplary bypass between an intake stream and an exhaust stream.

FIG. 2 shows an exemplary system 200 that includes an exemplary turbocharger arrangement 220. The components of the exemplary system 100 may include various features such as those described with respect to the prior art system of FIG. 1. However, the exemplary turbocharger arrangement 220 includes features not present in the system of FIG. 1.

The exemplary turbocharger arrangement 220 includes a compressor 224 and a turbine 226 operatively coupled to a rotatable shaft 222 (optionally more than one shaft) that may be driven by an electric motor 228. The arrangement 220 also includes a flow path or conduit 227 that can connect the outlet of the compressor 224 and the input to the turbine 226. In this example, flow through the flow path 227 is controllable via a flow regulator 229, which may be an adjustable valve. The flow regulator 229 can operate in conjunction with the electric assist as appropriate and may receive commands from a common controller such as the electric assist controller 240. Various exemplary algorithms for operation of such a controller are discussed further below.

The direction of flow through the flow path 227 is optionally from compressor outlet to turbine inlet or from turbine inlet to compressor outlet depending on need and various pressures (e.g., compressor outlet pressure, turbine inlet pressure, etc.). In this example, the flow path 227 branches from the compressor outlet prior to the heat exchanger 130; thus, an opportunity exists for allowing high temperature compressed air to flow from the compressor outlet to the turbine inlet upon a command to the flow regulator 229. Similarly, depending on the nature of the selected flow regulator 229 and various pressures (e.g., compressor outlet pressure, turbine inlet pressure, etc.), hot exhaust gas may flow from a point prior to the turbine inlet to a point in the intake stream of the engine 110 intermediate the compressor 224 and the heat exchanger 130. In the latter instance, recirculation of exhaust gas may be achieved.

Figure 3:
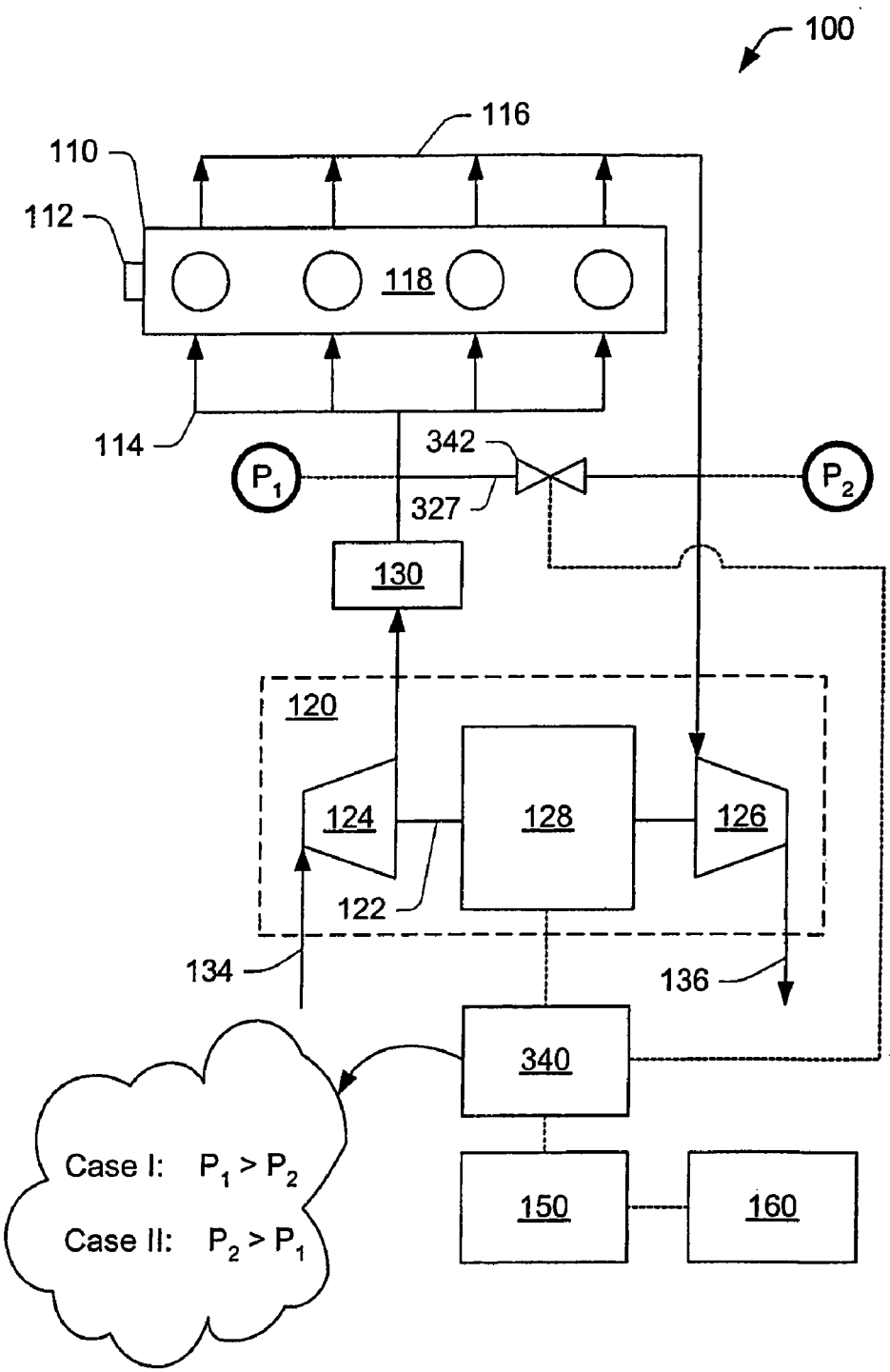
FIG. 3 is a simplified approximate diagram illustrating an exemplary turbocharger system with an exemplary bypass between an intake stream and an exhaust stream wherein two exemplary scenarios correspond to flow direction in the bypass.

FIG. 3 shows an exemplary system 300 that includes an electric assist turbocharger 120, an exemplary flow path or conduit 327 and an exemplary flow regulator 342 for regulating flow in the flow path 327. In this example, the flow path 327 is situated to connect at connection points, a first connection point along an intake air path intermediate the heat exchanger 130 and the engine 110 and a second connection point along an exhaust path intermediate the engine 110 and the turbine 126. While the flow regulator 342 is shown intermediate the connection points and along the flow path 327, in other examples, the flow regulator may be in-line with an exhaust path or an air intake path. Alternatively, more than one flow regulator may be used (e.g., one along an exhaust path and one along an air intake path).

Pressures $P_1$ and $P_2$ are shown to represent pressure at the two aforementioned connection points. In general, two cases exist where a substantial flow may occur in the flow path 327. Case I corresponds to $P_1 > P_2$ and Case II corresponds to $P_2 > P_1$. An exemplary controller 340 may make such determinations based on a model, operational parameters and/or sensed information. For example, the controller may receive pressure information or may distinguish occurrence of Case I or Case II upon power provided to the electric motor 128.

For Case II, recirculation of exhaust gas may be achieved, which may aim to address efficiency and/or other operational and/or emissions issues. For Case I, flow from the intake path to the exhaust path may act to diminish back pressure on the compressor and thereby be beneficial in avoiding surge.

Figure 4:
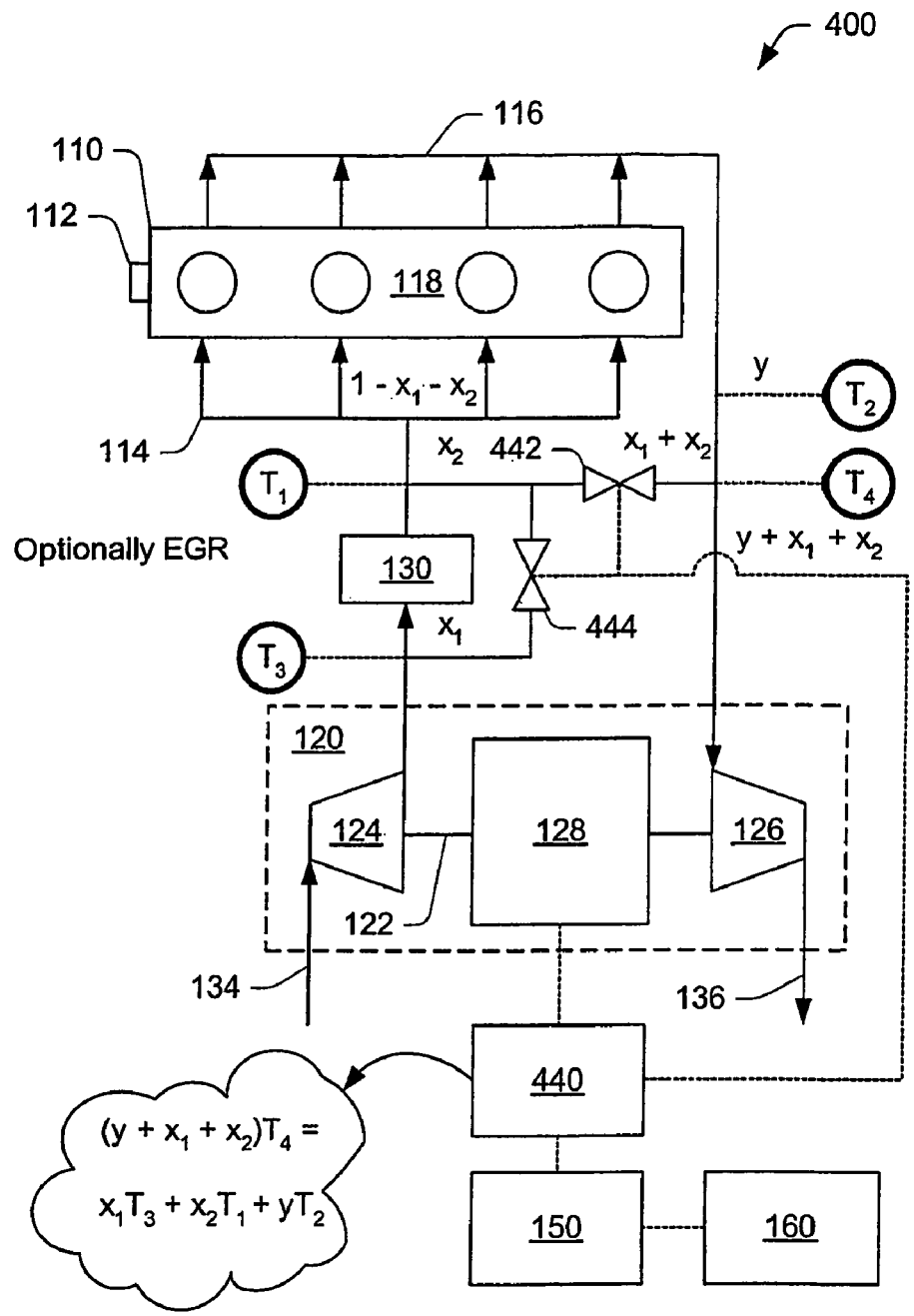
FIG. 4 is a simplified approximate diagram illustrating an exemplary turbocharger system with various exemplary flow paths for flow between an intake stream and an exhaust stream.

FIG. 4 shows an exemplary system 400 that includes two or more flow paths branching from an intake air stream to the engine 110. In this example, a first flow path branches intermediate the heat exchanger 130 and the compressor 124 and a second flow path branches intermediate the heat exchanger 130 and the engine 110. The first flow path has a corresponding flow regulator 444 and the second flow path has a corresponding regulator 442.

Various temperatures are shown $T_1$, $T_2$, $T_3$, $T_4$. Temperature $T_1$ corresponds to an inlet temperature to an inlet header 114 to the combustion chambers of the engine 110, temperature $T_2$ corresponds to an exhaust temperature of an exhaust header 116, temperature $T_3$ corresponds to a compressed air temperature prior to the heat exchanger 130 and the temperature $T_4$ corresponds to an exhaust temperature at a point where exhaust gas is optionally mixed with intake air.

Various mass flows are shown and labeled $x_1$, $x_2$ and y. A normalized mass flow of 1 represents mass entering the compressor 124. Mass flow $x_1$ corresponds to a mass flow of compressed air diverted from a stream entering the heat exchanger 130, mass flow $x_2$ corresponds to a mass of compressed air diverted from the intake to the exhaust stream and mass flow y corresponds to a mass of exhaust. In FIG. 4, the mass flows indicate that some intake air is being diverted to the exhaust.

A controller 440 allows for control of the valves 442, 444. The controller 440 optionally receives temperature information, mass flow information, pressure information and/or other information. Such information may allow the controller 440 to optimize performance of the system 400. Performance optimization may include temperature, pressure and/or mass flow optimization. For example, the following equation (Eqn. 1):

$$(y+x_1+x_2)T_4 = x_1 T_3 + x_2 T_1 + y T_2 \qquad (1)$$

may allow for energy balancing of an exhaust stream prior to the exhaust reaching a turbine. A reverse flow equation may also be used where some exhaust from an exhaust stream is diverted to an intake stream. In general, a relationship exists between intake air to the engine 110 and exhaust from the engine 110 (e.g., $y = f(x_1, x_2, \ldots)$).

The controller 440 also controls the electric motor and/or generator; thus, control of valves 442, 444 may be coordinated with energy provided to the electric motor 128 and energy extracted from the motor 128 when operated as a generator.

In one example, a flow path between an intake stream and an exhaust stream allows flow of some exhaust gas from the exhaust stream to the intake stream (e.g., exhaust gas recirculation). During activation of an electric motor that drives a compressor, a pressure difference between the intake stream and the exhaust stream acts to divert intake air from the intake stream to the exhaust stream (e.g., intake air is directly bypassed from compressor side to turbine side). In this example, a valve is optionally controlled in conjunction with the electric motor and/or a conventional EGR valve is used to aid in control for diversion of intake air or exhaust between a compressor side and a turbine side of a turbocharger system.

Figure 5:
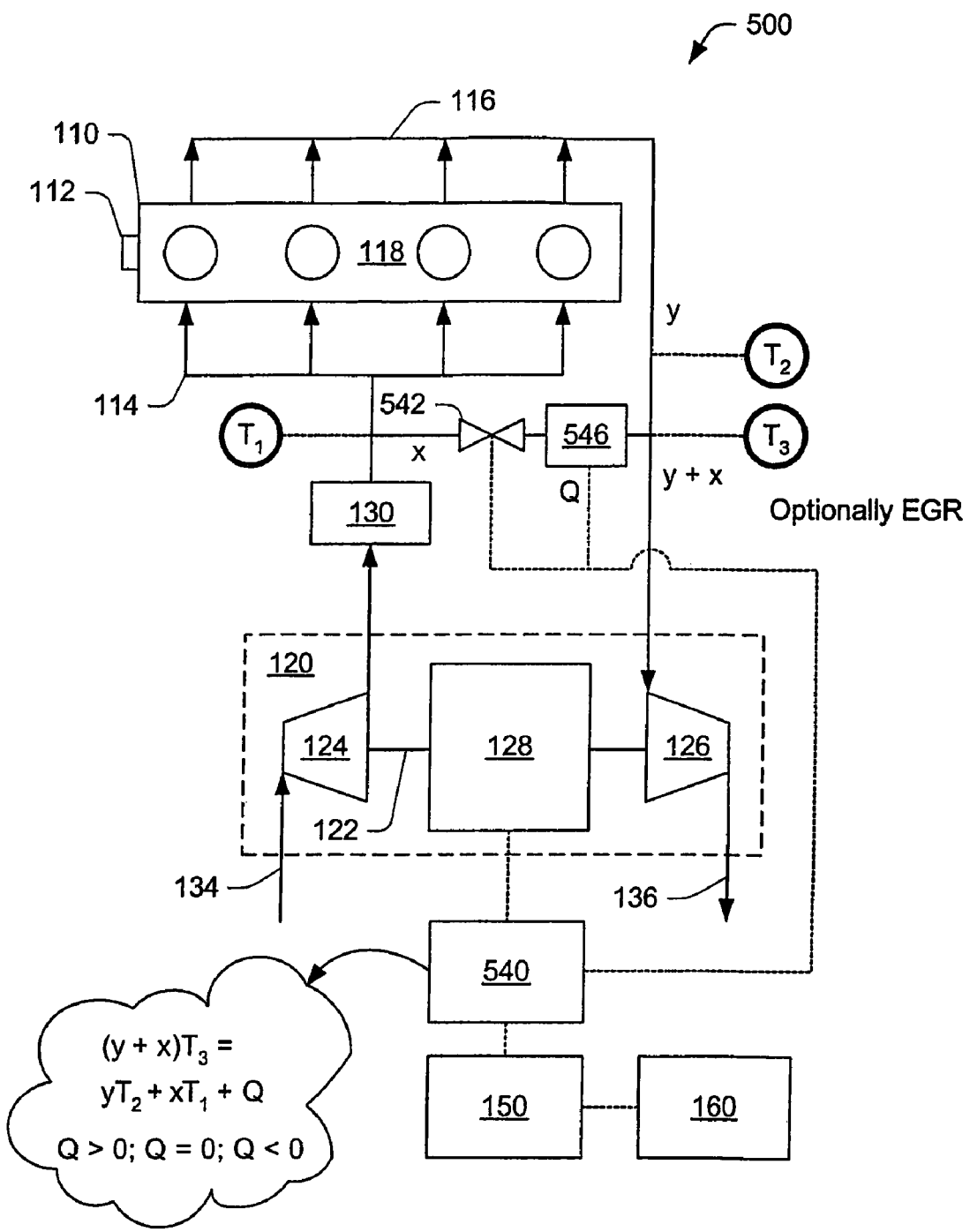
FIG. 5 is a simplified approximate diagram illustrating an exemplary turbocharger system with an exemplary bypass between an intake stream and an exhaust stream and with an exemplary device for adjusting energy of gas in the bypass.

FIG. 5 shows an exemplary system 500 that includes a heater, a burner or a heat exchanger 546 (e.g., heater device) capable of heating intake air or exhaust in flow path between an air intake stream and an exhaust stream. The heater device 546 is optionally an emission compliant burner that can provide an increase in bypass air temperature. Such a device may act to avoid a cooling of exhaust gas during flow of some intake air to the exhaust stream, which could decrease turbine performance. In this example, Q represents an energy flow from the heater device 546 to gas in the flow path controlled by valve 542. A controller 540 controls the valve 542, the heater device 546 and/or the electric motor 128, which optionally acts as a generator.

The heater device 546 optionally operates as a burner and optionally receives fuel from a fuel supply for the engine 110. The heater device 546 optionally includes one or more catalysts that may react with one or more components in flow stream to thereby produce heat. Such a device may also act to control emissions. An exemplary device includes a catalyst and an electric heating element.

An exemplary method includes use of a burner (e.g., item 546) during catalyst light off or particulate filter regeneration to allow for exhaust temperature control. In general, light off and/or filter regeneration require sufficient temperature or heat energy. Thus, the burner may allow for addition of heat energy sufficient to achieve light off and/or filter regeneration, for example, at times when exhaust does not provide sufficient energy. Such an exemplary method optionally operates in conjunction with a late injection and/or spark timing strategies. An exemplary method includes use of a burner (e.g., item 546) to control oxygen concentration or mass flow in an exhaust stream. An exemplary method includes use of a burner (e.g., item 546) to control emissions, improve emissions and/or to regenerate emissions control components. In some examples, introduction of intake air into an exhaust stream alone may aid in emissions control by providing oxygen to an exhaust stream. An increase in oxygen concentration or mass flow in an exhaust may also cause a catalyst to increase temperature. As described herein, various exemplary methods, devices, systems, etc., may allow for improved performance and/or emissions.

Referring again to FIG. 5, the exemplary controller 540 optionally relies on one or more control algorithms or control logic. For example, control logic may act to balance the following energy equation (Eqn. 2):

$$(y+x)T_3 = y T_2 + x T_1 + Q \qquad (2)$$

where x and $T_1$ represent a mass flow from the intake stream to the exhaust stream and a corresponding temperature prior to the heater 546, y and $T_2$ represents a mass flow from the engine 110 to the engine exhaust and a corresponding temperature and $T_3$ represents a temperature of exhaust to the turbine 126. In some instances, the device 546 may be a heat exchanger capable of extracting heat from a stream (e.g., Q<0).

Figure 6:
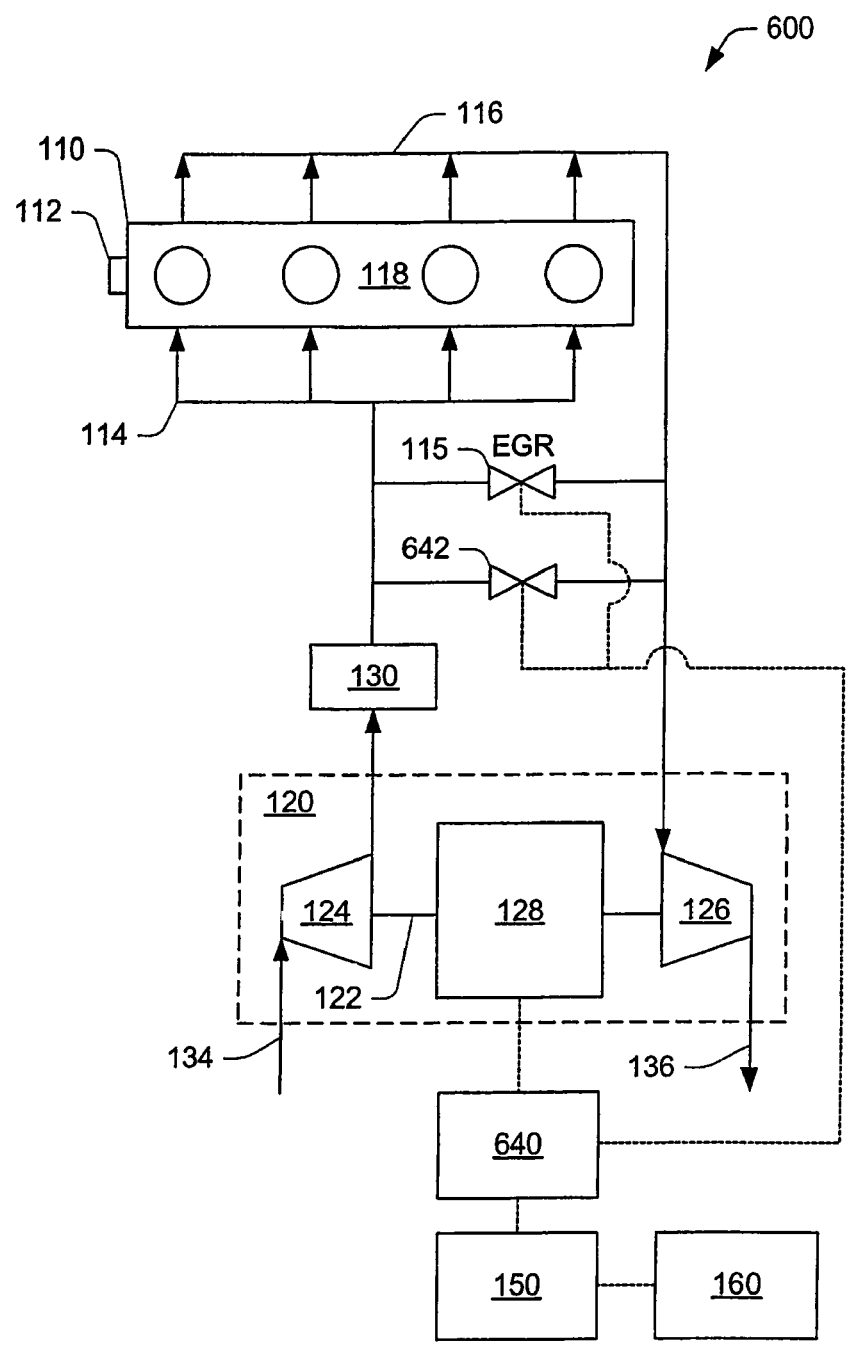
FIG. 6 is a simplified approximate diagram illustrating an exemplary turbocharger system with an EGR path and an exemplary bypass path between an intake stream and an exhaust stream wherein a controller optionally controls flow in one or both paths.

FIG. 6 shows an exemplary system 600 that includes an EGR valve 115 and a bypass valve 642. The EGR valve 115 and the bypass valve 642 can act to control flow between an intake stream and an exhaust stream of the engine 110. A controller 640 may control the EGR valve 115, the bypass valve 642 and/or the electric motor 128, which may optionally operate as a generator.

Figure 7:
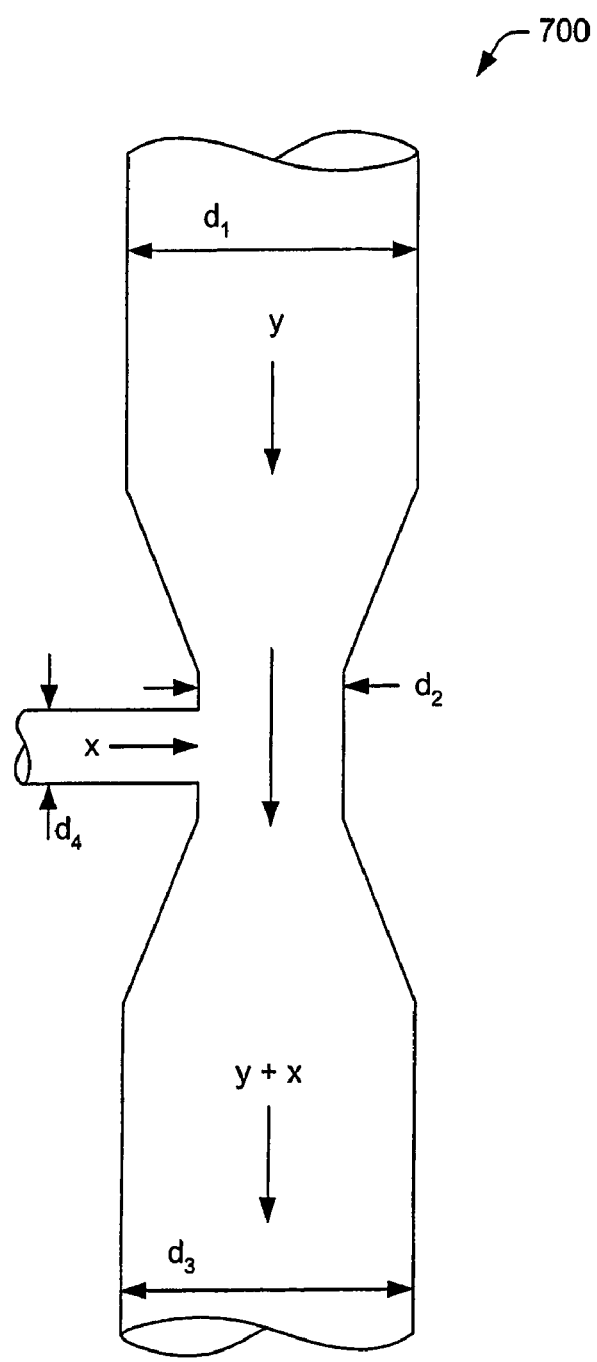
FIG. 7 is an exemplary venturi suitable for use in various exemplary systems, etc.

FIG. 7 shows an exemplary venturi 700 that may act to entrain or otherwise promote flow from an intake stream to an exhaust stream. In this example, the exemplary venturi 700 has substantially cylindrical cross-sections for inlet and exit conduits as well as for a constricted section. The inlet for exhaust has a diameter $d_1$, the constriction has a diameter $d_2$, which is less than $d_1$, and the outlet for exhaust and any additional gas (e.g., air) has a diameter $d_3$, which is optionally approximately equal to $d_1$. An inlet for intake air has a diameter $d_4$ and while the inlet operates in this example as a conduit for flow of intake air to an exhaust stream, such a conduit may operate in reverse, for example, depending on pressure, flow rate, valves, operating conditions, etc. In this example, the venturi 700 acts to promote flow of intake air from an orifice opening to the constricted section. The mass flows discussed in FIG. 5 may apply to the exemplary venturi 700 of FIG. 7. Thus, a mass flow y enters as exhaust from an internal combustion engine while a mass flow x is introduced via a conduit connected to the intake stream of the internal combustion engine (e.g., optionally downstream a compressor, a cooler, a heater, a burner, etc.).

Flow in the conduit of diameter $d_4$ is optionally controlled via a valve, as described elsewhere herein. The combined mass flow x+y continues to a turbine. Consequently, the exemplary venturi 700 may act to introduce intake air to an exhaust stream upstream from a turbine. Of course, a waste gate or other component may direct all or a portion of this stream (x+y) away from the turbine and optionally to an emissions control component (e.g., catalytic converter, etc.).

Overall, use of such an exemplary venturi may allow for adjustment of composition, temperature, flow rate, etc., of an exhaust stream even under circumstances where the intake air pressure and the exhaust pressure (e.g., $P_1$ and $P_2$ of FIG. 3) do not favor or allow for adequate flow from an intake stream to an exhaust stream. Flow through such a venturi is optionally controlled via a controller and in some examples another flow passage may exist that allows exhaust to reach a turbine without passing through a venturi. For example, consider a V6 engine wherein exhaust from one bank passes through a venturi and exhaust from another bank does not. In this example, a controller or selection of components may determine operational states.

The exemplary venturi 700 or an equivalent thereof is optionally used with various exemplary methods, devices, systems, etc., described herein and, in general, in conjunction with an electrically assisted turbocharger. However, other possible uses exist (e.g., conventional turbocharger, compressor only, etc.).

Figure 8:
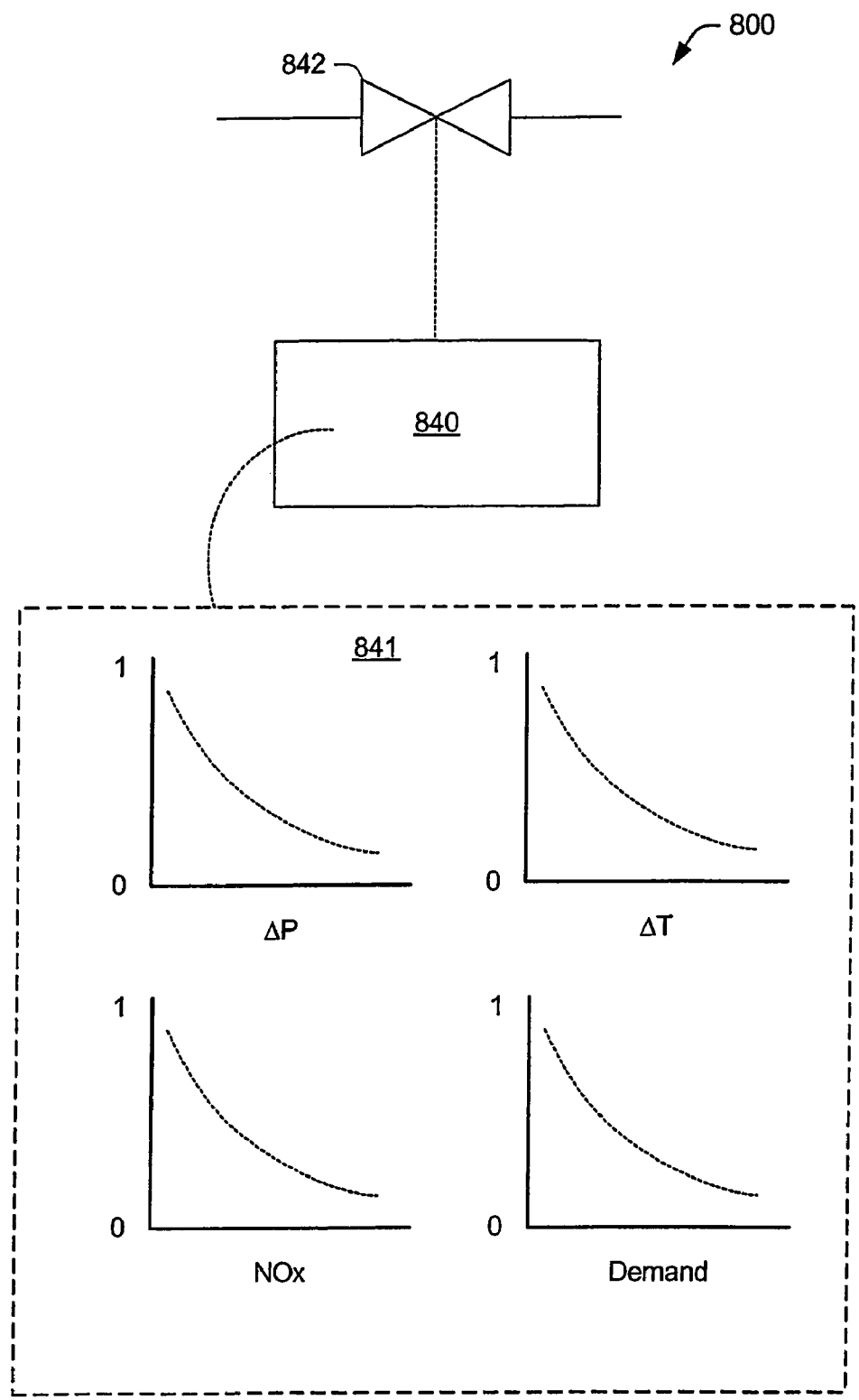
FIG. 8 is a diagram of an exemplary control scheme for control of flow between an intake stream and an exhaust stream.

FIG. 8 shows an exemplary control scheme 800 that includes a valve 842 and a controller 840. The controller 840 includes control logic 841 that may relate valve opening to one or more parameters. For example, the control logic 841 may include a relationship between valve opening and pressure or pressure difference, a relationship between valve opening and temperature or temperature difference, a relationship between valve opening and emissions (e.g., NOx concentration, mass, etc.) and/or a relationship between valve opening and demand.

As mentioned in the Background section, a surge limit represents a minimum mass air flow that can be maintained at a given compressor wheel rotational speed and a given pressure difference between the compressor inlet and outlet. Again, compressor operation is typically unstable in this area. Surge may occur upon a build-up of back pressure at the compressor outlet, which can act to reduce mass air flow through the compressor.

Various exemplary methods, systems, devices, controllers, etc., disclosed herein optionally act to control back pressure of a compressor by allowing some intake stream air to pass from the intake stream to an exhaust stream. For example, a controller may control a valve that allows for flow from an intake stream to an exhaust stream. In such an example, upon flow, pressure downstream from the compressor is reduced to thereby avoid surge. In this example, valve operation and power to an electric motor to operatively drive the compressor may be coordinated to avoid surge and/or optimize other performance criteria.

Some performance issues that can arise with an electric motor assisted turbocharger pertain to compressor map width and in particular compressor surge. Such a surge limitation can have the effect of requiring low end torque derating and thereby lessening benefit of an electric assist. Various exemplary systems, methods, devices, etc., disclosed herein aim to effectively increase map width, reduce risk of compressor surge, reduce low end torque derating and/or maximize benefits of an electric assist to a compressor of a turbocharger.

Although some exemplary methods, devices, systems, etc., have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A system comprising:
    a controller;
    an electrically assisted turbocharger that comprises an electric motor controllable by commands received from the controller; and
    a flow path that comprises
        a first opening to an air intake path of an engine, the first opening positioned downstream from a compressor of the turbocharger;
        a second opening to an exhaust path of an engine, the second opening positioned upstream from the turbine of the turbocharger; and
        a valve that regulates flow from the intake air path to the exhaust path, the valve controllable by commands received from the controller
    wherein the controller is configured to receive at least compressor outlet pressure information and to receive compressor wheel rotational speed information, wherein the controller includes control logic for controlling the valve and for controlling the electric motor of the electrically assisted turbocharger, based at least in part on received information, wherein the control logic acts to avoid compressor surge by coordinating control of the valve and the electric motor to increase compressor map width by controlling the valve to allow or increase flow from the air intake path to the exhaust path and by controlling the electric motor to maintain or increase compressor wheel rotational speed.

2. The flow path of claim 1 further comprising one or more temperature sensors capable of providing temperature information to the controller.

3. The flow path of claim 1 further comprising one or more pressure sensors capable of providing pressure information to the controller.

4. The flow path of claim 1 further comprising one or more mass flow sensors capable of providing mass flow information to the controller.

5. The flow path of claim 1 wherein the control logic acts to reduce emissions by controlling at least one member of the group consisting of the valve and the electric motor.

6. The flow path of claim 5 wherein the control logic acts to reduce emissions by controlling the valve and the electric motor.

7. The flow path of claim 1 further comprising a heater capable of heating gas in the flow path.

8. The flow path of claim 7 wherein the controller includes control logic to control the heater.

9. The flow path of claim 7 wherein the heater comprises a member selected from the group consisting of heat exchangers, electric heaters and burners.

10. The flow path of claim 7 wherein the heater comprises a catalyst.

11. The flow path of claim 1 wherein the flow path provides a mass of intake air to an exhaust stream wherein the mass of intake air has properties that act to reduce emissions of the engine.

12. The flow path of claim 1 wherein the flow path provides a mass of intake air to an exhaust stream wherein the mass of intake air has properties that act to increase performance of the engine.

13. One or more computer-readable media having computer-readable instructions thereon which, when executed by a programmable device, avoid compressor surge by receiving pressure information and receiving compressor wheel rotational speed information and, based on received information, adjusting an electric motor of an electrically assisted turbocharger of an engine to maintain or increase rotational speed of a compressor wheel of the turbocharger and adjusting one or more valves to allow or increase flow of gas between an intake path of the electrically assisted turbocharger of the turbocharged engine and an exhaust path of the engine wherein the gas flows from a stream downstream the compressor of the turbocharger to a stream upstream a turbine of the turbocharger and wherein the adjusting increases compressor map width.

14. The one or more computer-readable media of claim 13, wherein the programmable device adjusts the electric motor or the one or more valves based at least in part on information received from one or more sensors.

15. The one or more computer-readable media of claim 14, wherein the information includes information selected from the group consisting of pressure information, temperature information, compressor wheel rotational speed information, compressor wheel inertia information, energy provided to the electric motor information and mass flow rate information.

* * * * *